United States Patent [19]
Byrnes

[11] Patent Number: 5,188,513
[45] Date of Patent: Feb. 23, 1993

[54] SNUBBER-BEARING WITH COMBINED ELASTOMER LAMINATES

[75] Inventor: Francis E. Byrnes, White Plains, N.Y.

[73] Assignee: United Technologies Corporation, Hartford, Conn.

[21] Appl. No.: 908,770

[22] Filed: Jul. 1, 1992

Related U.S. Application Data

[63] Continuation of Ser. No. 628,269, Dec. 17, 1990, abandoned.

[51] Int. Cl.$^5$ ............................................. B64C 27/35
[52] U.S. Cl. ............................... 416/134 A; 416/140; 267/140.4
[58] Field of Search ............... 416/134 A, 131, 140; 267/140.4, 140.1, 152, 153

[56] References Cited

U.S. PATENT DOCUMENTS

| | | | |
|---|---|---|---|
| 3,504,905 | 4/1970 | Irwin | 267/152 |
| 3,606,295 | 9/1971 | Appleton | 267/153 |
| 3,610,610 | 10/1971 | Chassagne | 267/152 |
| 3,806,106 | 4/1974 | Hamel et al. | 267/152 |
| 4,105,266 | 8/1978 | Finney | 267/152 |
| 4,244,677 | 1/1981 | Noehren et al. | 416/134 A |
| 4,256,354 | 3/1981 | Peterson | 308/139 |
| 4,886,419 | 12/1989 | McCafferty | 416/134 A |
| 4,895,354 | 1/1990 | Byrnes | 416/134 A |
| 4,986,735 | 1/1991 | Robinson | 416/134 A |

FOREIGN PATENT DOCUMENTS 2399570  3/1979  France .

*Primary Examiner*—John T. Kwon

[57] ABSTRACT

A snubber set (30) for a helicopter rotor (10) is comprised of an inner race (44), an intermediate race (45), a preload plate (46), an inner portion (48) having alternating laminates of elastomer (52) and metal shims (54) which are spherically shaped, and an outer portion (50) having alternating laminates of elastomer (58) and metal shims (60) which are flat. The flat laminates (58) are comprised of a center portion (61) made from a high loss elastomer and a peripheral portion (62) made from a high shear strength elastomer.

12 Claims, 3 Drawing Sheets

SNUBBER-BEARING WITH COMBINED ELASTOMER LAMINATES

This is a request for filing a continuation application under 37 CFR 1.62 of prior pending application Ser. No. 07/628,269 filed on Dec. 17, 1990, now abandoned.

DESCRIPTION

1. Technical Field

This invention relates to snubber-bearings on helicopter rotors, and more particularly to the elastomer damping laminates within snubber-bearings.

2. Background Art

In flexbeam helicopter rotors, whether of the even bladed crossbeam variety shown in U.S. Pat. No. 4,244,677, or of the odd numbered blade variety disclosed herein, it is necessary to provide positioning and load carrying means between the flexible spar and its enveloping torque tube to perform the function of positioning the spar for pitch change and flapping motion about the intersection of the pitch change and flapping axes, for imparting pitch change control and other loads therebetween, and for accommodating relative motion therebetween.

A snubber-bearing, or snubber, serves as a supporting attachment to react control loads between the flexible spar and the rigid torque tube of a helicopter rotor and maintain the proper relationship between the spar and torque tube. The snubber is typically made of a rubber or elastomer material which accommodates the pitch motions of the torque tube, the flapwise bending of the spar, and the in-plane, edgewise bending (lead-lag) of the blade.

In U.S. Pat. No. 4,244,677, Noehren et al disclosed the use of a snubber with alternating laminates of elastomer and metal shims. This snubber takes advantage of the higher shape factor, which is the ratio of compression area to bulge area, of a series of thin layers versus a single thick layer. The higher shape factor increases the compression strength and stiffness of the snubber. The snubber included spherical laminates which accommodate the pitch change and flapping motions and flat laminates which dampen the lead-lag motion of the blade.

A limiting factor in the design and use of the laminate snubbers is the magnitude of the shear strain encountered at the free edges of the flat elastomer laminates, which is where the maximum shear strain occurs. The shear strain at the free edge is a combination of static shear strain due to compressive pre-loads and dynamic shear strain due to the motion to be dampened. For main rotors with high head-moments and corresponding high chordwise loading, the shear strain at the free edges can exceed the allowable shear strain of elastomers which have acceptable loss factors or damping ability. This result is due to the inverse relationship between allowable shear strain and loss factor for elastomer materials.

A common method to increase the shear strength of an elastomer laminate to dynamic strain is to 'pre-load' the snubber prior to installation by subjecting the snubber to a compressive load. Allowable shear strain for fatigue (i.e. under dynamic loads) of an elastomer increases under a compressive loading and decreases if subjected to tensile loading. In U.S. Pat. No. 4,244,677 the precompression was performed by utilizing a bolt to draw the inner race towards the outer race. This preload bolt was mounted between the inner and outer race and therefore required the laminates to be apertured to accommodate the bolt. The free surface around the aperture created an area of significant stress concentration due to the bulge area around the aperture being forced into a small volume.

U.S. Pat. No. 5,092,738 for "Flexbeam Helicopter Rotor With Improved Snubber-Vibration Damper Between the Torque Tube and the Flexible Spar Member" by Byrnes et al discloses a method of preloading laminates which are continuous, i.e. without apertures. In that invention the preloading is performed by positioning preload plates which are bonded to the outer laminate and bolt down onto the torque tube. The requirement for a preload bolt and aperture, and thereby the free surface and stress concentration area, is eliminated.

Unfortunately, the radial edge of a laminate, whether continuous or not, is still a free edge and cannot be compression loaded. The result, for a preloaded laminate of elastomer, is that the allowable shear strain for fatigue is maximum at the center and decreases radially toward the edge. At the edge, the allowable shear strain for fatigue of the laminate is minimum (approximately equal to the unloaded allowable shear strain of the elastomer). A result of the compressive preload is that the compression induced shear strain (i.e. static shear strain) increases radially to a maximum at the radially outer edge. Therefore, the shear strain at the edge governs the selection of elastomer.

One solution is to select an elastomer which meets the requirements for shear and then increase the number of laminates until the desired amount of damping is attained. Unfortunately, this solution increases the size and weight of the snubber, and the size of the envelope containing the snubber, which results in an undesirable increase in aerodynamic drag of the rotor. Another solution is to select an elastomer which meets the damping requirements and then reduce the thickness of each laminate, thereby taking advantage of the increased shape factor in order to stay below the allowable shear strain. The drawback to this solution is that the increase in the number of laminates requires a corresponding increase in the number of shims. This solution also results in an increase in the size and weight of the snubber and in aerodynamic drag.

In U.S. Pat. No. 4,886,419 McCafferty disclosed a spherical bearing for fully articulated retention of a tail rotor or fan blade to a hub. The spherical bearing was comprised of alternating laminates of elastomer, with particularly shaped and oriented apertures formed in the centers, and metal shims. Coupons of elastomer, with greater damping characteristics than the elastomer used in the laminate, were fitted within the openings to provide lead-lag damping for the retention system. Unfortunately, having a free edge around the openings distorts the pressure and shear strain distributions in the laminates and coupons and requires that a high strain allowable material be used for both the laminates and the coupons. This shear strain allowable requirement thereby eliminates the possibility of using a high damping material for the coupon.

DISCLOSURE OF INVENTION

An object of the present invention is an improved flat, continuous elastomer damping laminate for a snubber which increases the loss factor of the snubber without increasing the size and weight of the snubber.

Another object is an improved snubber set for a helicopter rotor which results in an increase in lead-lag damping without increasing the aerodynamic drag of the rotor.

According to the invention, a flat damping laminate for a snubber is comprised of a continuous center portion of high damping, moderate shear elastomer and an annular peripheral portion of moderate damping, high shear elastomer. The two portions are the same thickness, substantially the same shear modulus, and are joined such that there is continuity in the laminate. The center portion, since it is in an area of low shear and high compression, provides maximum damping while meeting the allowable shear strain requirements. The peripheral portion provides shear strength at the free edge where the shear strains are maximum and the compressive pre-load is minimum. In this way the loss factor of each laminate is increased and the overall loss factor of the snubber may be increased without having to increase the size of the snubber. In addition, the number of laminates required is reduced, and, correspondingly, the number of shims required is reduced, which further reduces the size and weight of the snubber.

The foregoing and other objects, features and advantages of the present invention will become more apparent in light of the following detailed description of the exemplary embodiment thereof, as illustrated in the accompanying drawings.

BRIEF DESCRIPTION OF THE DRAWINGS

FIG. 3 is a perspective view of an elastomer laminate according to the invention.

FIG. 4 is a sectional view of the elastomer laminate of FIG. 3, taken along line 4—4 thereof.

BEST MODE FOR CARRYING OUT THE INVENTION

Figure 1:
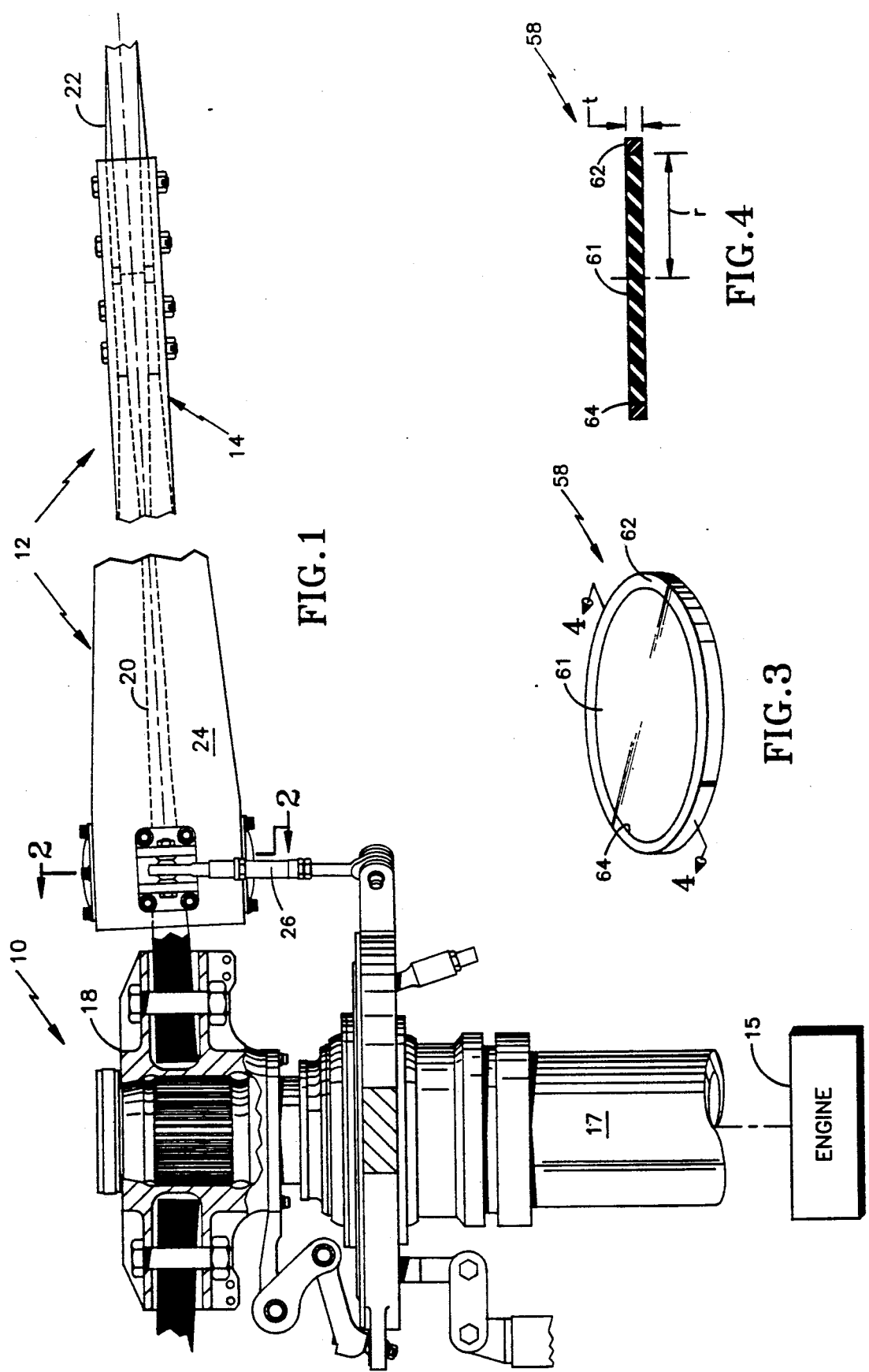
FIG. 1 is a side view of a helicopter rotor incorporating elastomer laminates in accordance with the invention.

Referring now to FIG. 1, a helicopter flexbeam rotor 10 is comprised of a plurality of blade assemblies 12 (only one of which is shown), disposed on a hub member 18 which is mounted on a fuselage (not shown) and connected to an engine 15 by a drive shaft 17. Each blade assembly 12 is connected to hub member 18 by a radially-extending flexible spar 20. The hub member 18 reacts centrifugal, torsional, and bending loads of the blade assemblies 12. Each blade assembly 12 also includes a blade 14 having an airfoil portion 22 at the outer end and an elliptical torque tube portion 24 at the inner end, which portions are connected directly or indirectly to spar 20. The torque tube portion 24 envelops the spar 20 and provides clearance to permit twisting of the spar 20 to accommodate blade 14 pitch changes. The pitch changes are transmitted from a pitch control rod 26 which is connected to the torque tube 24.

Figure 2:
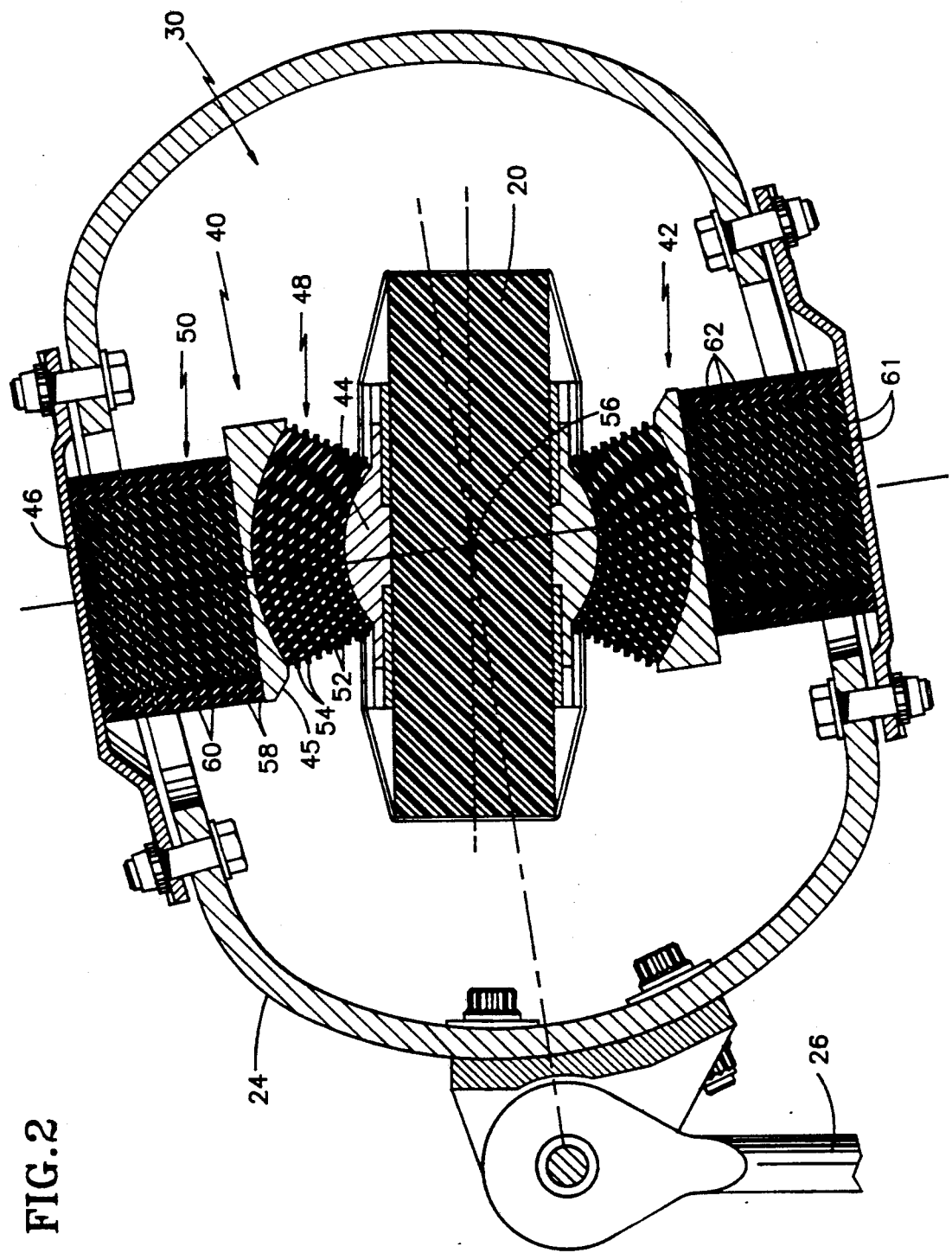
FIG. 2 is a sectional view taken along line 2—2 of of FIG. 1, depicting the snubber set incorporating elastomer laminates in accordance with the invention.

Referring to FIG. 2, a snubber set 30, disposed between the spar 20 and the torque tube 24, maintains the proper relative alignment of the torque tube 24 and the spar 20 and accommodates pitch motion, flapwise bending, and edgewise bending (lead-lag motion). The snubber set 30 is comprised of an upper snubber 40 and an identical lower snubber 42. Since the upper snubber 40 and lower snubber 42 are the same, only the upper snubber will be described in detail and will be referred to simply as a snubber. The snubber 40 is comprised of an inner race 44, an intermediate race 45, a pre-load plate 46 which is mounted on the torque tube 24, an inner portion 48, and an outer portion 50. The snubbers 40 are pre-loaded during installation by tightening the preload plate 46 down onto the torque tube 24, which compresses the snubber 40. The compression increases the allowable shear stress of the snubber 40.

The inner portion 48 includes a stack of alternating layers of laminates of elastomer 52 and metal shims 54 which are spherically shaped. The laminates form a spherical bearing which is concentric about a center point 56 and provides control over the pitch and flap motion of the blade 14. The outer portion 50 also includes a stack of alternating layers of laminates of elastomer 58 and metal shims 60, but which are flat in construction. The flat laminates motion of the blade. It is these flat laminates to which the present invention is directed.

In prior art snubbers, the laminates are constructed from a single material which has to meet both the damping and shear strength requirements of the snubber. Since damping and shear strength are inversely related the number of laminates has to be increased in order to meet both requirements. Increasing the number of laminates, and the corresponding number of shims, increases the size of the snubber, which increases the aerodynamic losses of the rotor, and weight of the snubber.

In an exemplary embodiment, flat laminates 58 in accordance with the present invention are comprised of a continuous, circular center portion 61 and an annular peripheral portion 62, as shown in FIGS. 3 and 4, of the same thickness t. The center portion 61 is fabricated from a material chosen principally for its damping characteristics and the peripheral portion 62 is fabricated from a material chosen principally for its shear strength characteristics. The center portion 61 and the peripheral portion 62 have the same, or substantially the same, material shear modulus. The shear moduli of the two portions are substantially the same if the two portions deform compatibly. Incompatible deformation may cause discontinuities and stresses at a junction 64 between the two portions. The junction 64 provides a joining between the two portions 61,62 such that the laminate 58 is continuous with no free edges other than the radially outer edge of the peripheral portion 62.

By combining a center portion material with high damping ability and a peripheral portion material with high shear strength, the snubber overall damping ability can be increased without increasing the overall size of the snubber. The combined laminate takes advantage of the compression pre-load to increase the strength of the center portion to acceptable levels and of the inherent shear strength of the peripheral portion to meet the shear strain requirements near the radial edges of the laminate.

Figure 5:
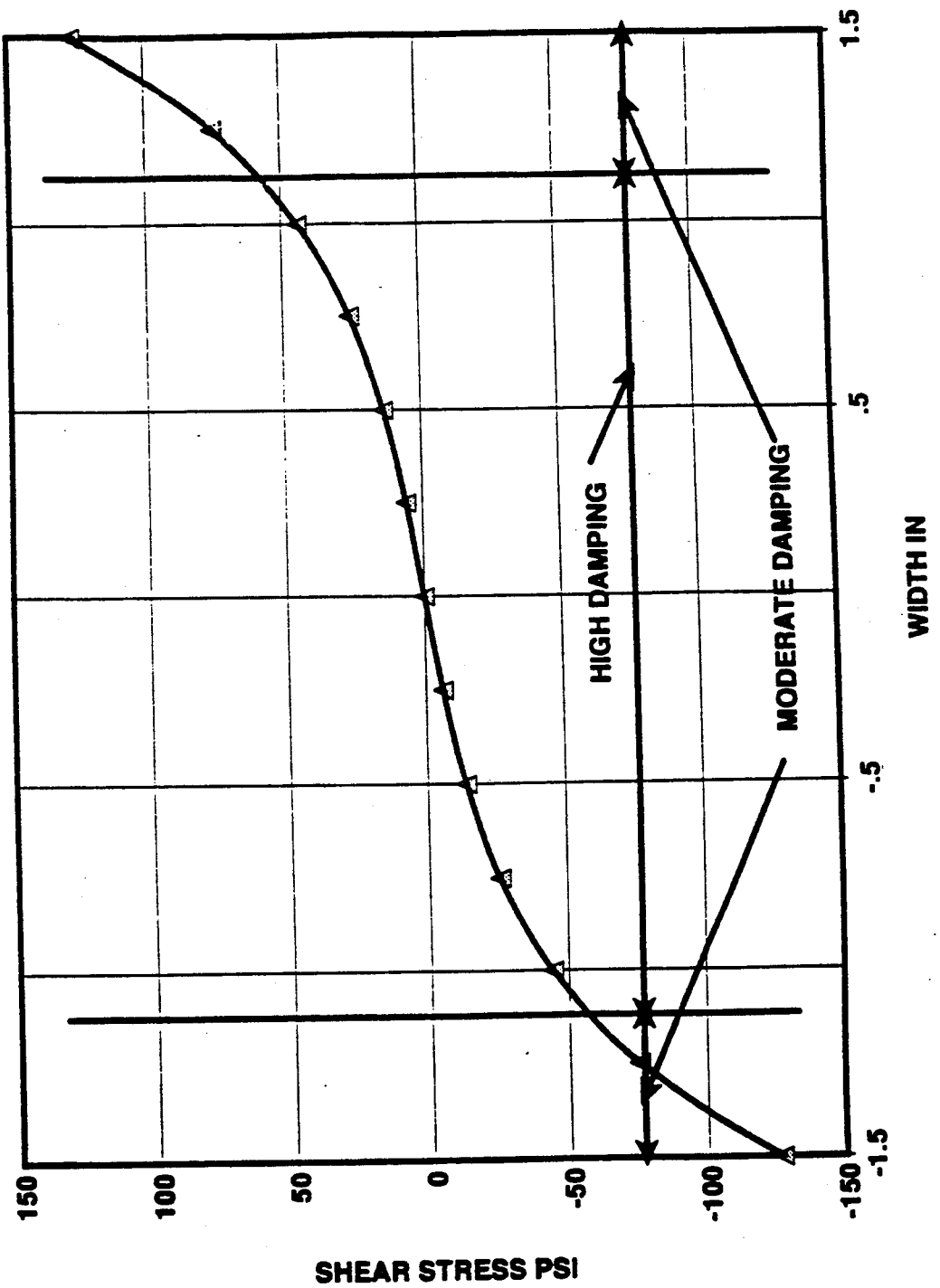
FIG. 5 is a graph of shear stress as a function of radial position with areas of low shear and high shear indicated.

Selection of elastomer materials for the laminates and determination of the radius of the center portion, or the inner radius of the peripheral portion, is dependant upon the shear distribution in a cross section of the laminates and follows well known design practices for snubber bearings. An elastomeric material which meets the shear strain requirements at the outer edge of the laminate is selected for the peripheral portion. An elastomeric material which meets the damping requirements of the laminate is selected for the center portion. The radius of the center portion is then determinable from the distribution of shear stress, which is related to shear strain by the shear modulus, generated by the compression pre-load. An example of a shear stress distribution is shown in FIG. 5. The center portion radius is selected to be equal to the radius at which the shear strain equals the allowable shear strain of the center portion reduced by an acceptable factor to accommodate peak loading conditions during operational use. As with prior art damping laminates, the materials selected must also meet fatigue requirements for dynamic shear loading. For example, FIG. 5 is a graphic presentation of the distribution of shear stress, for a 1.5" radius, 0.10" thick laminate under 2250 psi of compression loading. In this example a silicone elastomer (loss factor=0.65, allowable shear strain for fatigue @$36 \times 10^6$ cycles=8%, allowable static shear strain =65%, =8%, shear modulus=200 psi) was selected for the center portion and a polybutadiene elastomer (loss factor=0.4, allowable strain for fatigue @$36 \times 10^6$ cycles=16%, allowable static shear strain=130%, shear modulus=200 psi) was selected for the peripheral portion. For a laminate of these dimensions and materials, and using a factor of two (2) to accommodate peak loads during operational use, the radius of the center portion (high damping, moderate shear strength), or the inner radius of the peripheral portion (moderate damping, high shear strength) is approximately 1.125".

Although the invention has been shown and described with respect to exemplary embodiments thereof, it should be understood by those skilled in the art that various changes, omissions and additions may be made therein and thereto, without departing from the spirit and the scope of the invention. For example, although the damping laminate of the invention has been depicted and described in a circular configuration, other geometries would be within the scope of the invention.

What is claimed is:

1. A flat damping laminate adapted to be compression loaded in a direction perpendicular to the flat direction, the laminate comprised of a continuous center portion formed from a first elastomer material having a first allowable shear strain, and a peripheral portion encompassing said center portion, said peripheral portion formed from a second elastomer material having a second allowable shear strain, wherein the second allowable shear strain is greater than the first allowable shear strain, wherein said center portion and said peripheral portion are joined to form a continuous laminate, and wherein the second allowable shear strain is equal to or greater than the shear strain in the peripheral portion caused by the compression load.

2. The damping laminate according to claim 1, wherein said center portion is circular, said peripheral portion is annular, said center portion and said peripheral portion are concentric, and said center portion and said peripheral portion are joined to form a diametrically continuous laminate.

3. The damping laminate according to claim 1, wherein said center portion and said peripheral portion have equal thickness.

4. The damping laminate according to claim 1, wherein said center portion has a first shear modulus, said peripheral portion has a second shear modulus, and wherein said first shear modulus and said second shear modulus are substantially the same.

5. A snubber-bearing having alternate planar laminates of elastomer and non-extensible material, said laminates of elastomer extending between adjacent layers of non-extensible material and adapted to be compression loaded in a direction perpendicular to the planar direction, the compression caused by adjacent layers of non-extensible material compressing the laminate of elastomer therebetween, said laminates of elastomer being comprised of a continuous center portion formed from a first elastomer material having a first allowable shear strain and a peripheral portion encompassing said center portion, said peripheral portion formed from a second elastomer material having a second allowable shear strain, the second allowable shear strain being greater than the first allowable shear strain, wherein said center portion and said peripheral portion are joined to form a continuous laminate, and wherein the second allowable shear strain is equal to or greater than the shear strain in the peripheral portion caused by the compression load.

6. The snubber-bearing according to claim 5, wherein said center portion is circular, said peripheral portion is annular, said center portion and said peripheral portion are concentric, and said center portion and said peripheral portion are joined to form a diametrically continuous laminate.

7. The snubber-bearing according to claim 5, wherein said center portion and said peripheral portion have equal thickness.

8. The snubber-bearing according to claim 5, wherein said center portion has a first shear modulus, said peripheral portion has a second shear modulus, and wherein said first shear modulus and said second shear modulus are substantially the same.

9. A helicopter rotor having a hub member and a blade assembly mounted on said hub member, said blade assembly including a flexible spar mounted on and extending radially from said hub member, a blade connected to said spar, said blade being comprised of an airfoil portion at a radially outer end and a torque tube at a radially inner end, said torque tube being in spaced relation to and enveloping said spar, and a snubber set disposed at a radially inner end of said torque tube, said snubber set being comprised of an upper snubber portion extending between an upper surface of said spar and said torque tube and a lower snubber portion extending between a lower surface of said spar and said torque tube, each of said snubber portions comprising an inner race, an intermediate race, a preload plate, and alternate planar laminates of elastomer and non-extensible material, said laminates of elastomer extending between adjacent layers of non-extensible material and adapted to be compression loaded in a direction perpendicular to the planar direction, the compression caused by adjacent layers of non-extensible material compressing the laminate of elastomer therebetween, said laminates of elastomer being comprised of a continuous center portion formed from a first elastomer material having a first allowable shear strain and a peripheral portion encompassing said center portion, said peripheral portion formed from a second elastomer material having a second allowable shear strain, wherein the second allowable shear strain is greater than the first allowable shear strain, wherein said center portion and said peripheral portion are joined to from a continuous laminate, and wherein the second allowable shear strain is equal to or greater than the shear strain in the peripheral portion caused by the compression load.

10. The helicopter rotor according to claim 9, wherein said center portion is circular, said peripheral portion is annular, said center portion and said peripheral portion are concentric, and said center portion and said peripheral portion are joined to form a diametrically continuous laminate.

11. The helicopter rotor according to claim 9, wherein said center portion and said peripheral portion have equal thickness.

12. The helicopter rotor according to claim 9, wherein said center portion has a first shear modulus, said peripheral portion has a second shear modulus, and wherein said first shear modulus and said second shear modulus are substantially the same.

* * * * *